US011645453B2

(12) United States Patent
Cervelli et al.

(10) Patent No.: US 11,645,453 B2
(45) Date of Patent: *May 9, 2023

(54) TRANSFORMATION IN TABULAR DATA CLEANING TOOL

(71) Applicant: Palantir Technologies Inc., Denver, CO (US)

(72) Inventors: Daniel Cervelli, Mountain View, CA (US); Adam Storr, Sao Paulo (BR); Jesse Rickard, New York, NY (US); A. Rafee Memon, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,239

(22) Filed: Jun. 22, 2022

(65) Prior Publication Data

US 2022/0318493 A1 Oct. 6, 2022

Related U.S. Application Data

(63) Continuation of application No. 17/249,292, filed on Feb. 25, 2021, now Pat. No. 11,403,460, which is a
(Continued)

(51) Int. Cl.
*G06F 17/00* (2019.01)
*G06F 40/177* (2020.01)
(Continued)

(52) U.S. Cl.
CPC .......... *G06F 40/177* (2020.01); *G06F 16/221* (2019.01); *G06F 16/2358* (2019.01)

(58) Field of Classification Search
CPC ...... G06F 40/177; G06F 40/166; G06F 40/18; G06F 16/221; G06F 16/2358; G06F 16/215
See application file for complete search history.

(56) References Cited

U.S. PATENT DOCUMENTS 7,797,356 B2 * 9/2010 Iyer ....................... G06F 40/177
707/625
8,316,318 B2 * 11/2012 Shortell ................. G06Q 10/10
715/212

(Continued)

*Primary Examiner* — Laurie A Ries
(74) *Attorney, Agent, or Firm* — Knobbe, Martens, Olson & Bear, LLP

(57) ABSTRACT

A system including first computer memory storing a full data set representable in rows and columns, a second computer memory storing executable instructions, and processors configured to execute the instructions to cause presentation of data of the full data set on a display including columns of data each having data fields, receive user input identifying a column of the data set, determine items to modify in information in the data fields of the identified column, generate and cause display of an indication of a proposed change action to modify the determined items, and in response to a user input indicating a selection of the indication of the proposed change action, update the presentation of the data based on the change action to modify information displayed in the data fields of the identified column of the data, and store a log of the change action.

20 Claims, 10 Drawing Sheets

Related U.S. Application Data continuation of application No. 16/714,278, filed on Dec. 13, 2019, now Pat. No. 10,963,633, which is a continuation of application No. 16/351,215, filed on Mar. 12, 2019, now Pat. No. 10,546,056.

(60) Provisional application No. 62/679,615, filed on Jun. 1, 2018.

(51) Int. Cl.
*G06F 16/23* (2019.01)
*G06F 16/22* (2019.01)

(56) References Cited

U.S. PATENT DOCUMENTS

| | | | |
|---|---|---|---|
| 8,751,216 B2 * | 6/2014 | Akiki | G06F 40/177 |
| | | | 704/7 |
| 10,546,056 B1 | 1/2020 | Cervelli et al. | |
| 10,963,633 B2 | 3/2021 | Cervelli et al. | |
| 11,403,460 B2 | 8/2022 | Cervelli et al. | |
| 2018/0240019 A1 * | 8/2018 | Sato | G06F 40/30 |
| 2018/0349456 A1 * | 12/2018 | Pogrebtsov | G06Q 10/10 |
| 2019/0042635 A1 * | 2/2019 | Kim | G06F 16/2453 |

\* cited by examiner

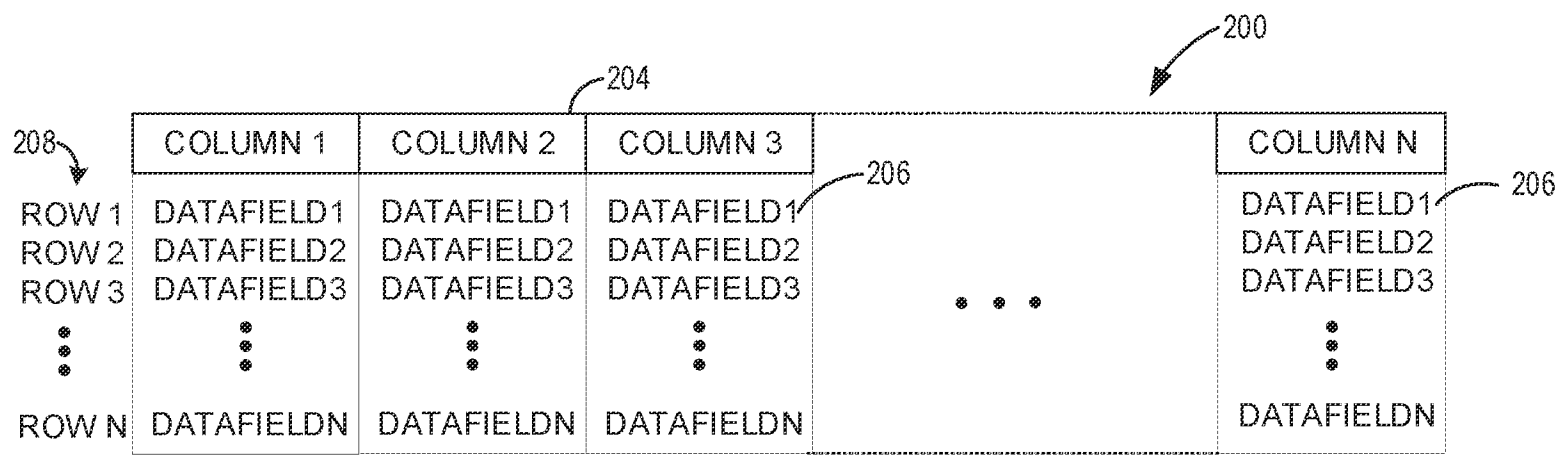

| | COLUMN 1 | COLUMN 2 | COLUMN 3 | ... | COLUMN N |
|---|---|---|---|---|---|
| ROW 1 | DATAFIELD1 | DATAFIELD1 | DATAFIELD1 | | DATAFIELD1 |
| ROW 2 | DATAFIELD2 | DATAFIELD2 | DATAFIELD2 | | DATAFIELD2 |
| ROW 3 | DATAFIELD3 | DATAFIELD3 | DATAFIELD3 | | DATAFIELD3 |
| ... | ... | ... | ... | | ... |
| ROW N | DATAFIELDN | DATAFIELDN | DATAFIELDN | | DATAFIELDN |

FIG. 2

TRANSFORMATION IN TABULAR DATA CLEANING TOOL

TECHNICAL FIELD

The present disclosure relates to systems and techniques for preparing data for subsequent processing and/or analysis. More specifically, this disclosure relates to techniques for analyzing data fields of large tabular-representable data and defining rules that generate a new dataset for future use of the data.

BACKGROUND

Large data sets representable in tabular form may have dozens, or even hundreds, of columns and millions or billions (or more) of rows of data. Often, the generation of the data set involves receiving information that was entered into many different computers by a many people (e.g., thousands, tens of thousands, or millions). Not surprisingly, such data sets include errors, for example, misspelled words, erroneous white spaces, incorrect placement of punctuation, incorrect data types, duplicate information (e.g., double entry), and inconsistent information.

At least due to the sheer size of the data set, manually correcting all of the errors in the data set is effectively an impossible task. Even if the errors could be identified, manually correcting all the errors would be extremely time-consuming, and overburden resources for data sets containing hundreds of millions of rows of data. However, if the data is not corrected, thousands of errors could occur during subsequent processing of the data, which would slow down or stop the processing, and it could also result discarding important data due to its inconsistencies. In addition, even if one large data set is corrected, second large data set will have similar problems and manual corrections would again be required to each incorrect data field.

SUMMARY

Embodiments of systems and methods of user interface-based software tool for cleaning or preparing tabular data for further analysis are disclosed herein. Large data sets representable in tabular form may have dozens, or even hundreds, of columns and millions or hundreds of millions (or more) of rows of data having numerous data fields, which may contain numerous errors or inconsistencies (e.g., unwanted white spaces, misspelled words, incorrect characters or numbers, erroneous punctuation, and the like). The errors maybe common to numerous data fields. Even if the errors could be identified, manually correcting all the errors would be extremely time-consuming, and overburden resources for data sets containing tens of thousands, hundreds of thousands, millions or even hundreds of millions (or more) of rows of data (i.e., large data sets). However, if the data is not corrected, thousands of errors could occur during subsequent processing of the data, which would slow down or stop the processing, and it could also result discarding important data due to its inconsistencies.

The data fields of a data set each includes information that comprises one or more values, depending on the defined size of the data field. The user interface-based software tool may clean or prepare a data set for further analysis or processing by modifying the values or information that is in one or more data fields ("sometimes also referred to as data field information") of the data set. Each "value" may include, for example, a number, a letter (upper case, lower case, or mixed), any alpha-numeric character, a word, and underscore, a "space" (e.g., a leading "space," a trailing "space," or a "space" anywhere in the data field), a null value, punctuation (e.g., a period, comma, colon, semi-colon, exclamation mark, parenthesis, quotation marks, or the like), or a symbol (e.g., including one or more of the following symbols: $, %, @, #, /\, &, *, /, |, ~, *, -, a). Some examples of ways information in a data field may be modified include (i) correcting a misspelling, (ii) removing one or more values that comprise the information, (iii) adding one or more values to the information, or (iv) transforming one or more values in the information to be a different value. In another example, the user interface-based software tool can be used to remove or add data fields, rows, and/or columns, and manipulate rows and columns to serve future use of the data, for example analysis, joining, visualization, or presentation.

In operation, because a large data set can be unwieldly to work with (e.g., a data set that includes billions of rows of data), a representative portion of the large data set residing on a computer memory component can be stored on a local computer memory component where it can be easily and quickly accessed. By analyzing displayed data representative of the large data set, and metrics and information relating to the large data set using the tools and functionality described herein, a user may determine cleaning and preparing operations to be performed on the large data set, and these cleaning and preparing operations may be saved to a log (sometimes referred to herein as a "change data log"). The analysis functionality described herein never actually changes the source dataset, instead allowing a user to create a new dataset derived from the original dataset. In operation, a user can see (e.g., through statistics, histograms) the outcome of their "changes" or "modifications" on the entire dataset as they implement them, even if the dataset has millions or billions of rows of data. This is different than other products that allow a user to operate on a small portion of the whole dataset, and then apply the changes to the whole dataset afterwards. In other words, in this use case the cleaning and preparing operations that a user defines to be applied to a large data set are a set of operations to be applied subsequently to change the large data set (for example, by creating a new large data set), rather than changing the data set at the time the user is analyzing what data fields need to be changed. Accordingly, unless otherwise indicated, the "changes" discussed herein are in the context of changes to the dataset that can be implemented to create a derived dataset from the dataset, the functionality allowing a user to see the effect of the change on the dataset, store the changes in a log, and then subsequently apply the changes to the dataset to create a derived dataset. That is, when a change is made to a dataset, the user can see (e.g., via statistics, histograms, etc.) the outcome of the changes on the entire dataset without actually changing the dataset. This advantageously allows for better data integrity because the original large data set is not changed at the time the user is analyzing the data to determine what needs to be changed. The operations in the change data log can subsequently be applied to the large data set (or a copy of the large data set) to prepare it for further processing or analysis, e.g., by creating a derived dataset. Also, the operations in the change data log may be applied to a second different (but similar) large data set to clean and create a derived data set from the second large data set for further processing. In some cases, the operations can be used to define a processing pipeline such that when applications use the large data set, or a portion of the large data set, it is processed by the operations in the change data log as the data is provided to an application.

Accordingly, one innovation includes a system comprising a first non-transitory computer storage medium configured to store a first data set representable in a tabular rows and columns format, a second non-transitory computer storage medium configured to at least store computer-executable instructions, and one or more computer hardware processors in communication with the second non-transitory computer storage medium, the one or more computer hardware processors configured to execute the computer-executable instructions to at least cause presentation of a data on a display device, the data representing the first data set or a portion of the first data set. The presentation of the data may include a plurality of columns of data, each of the columns of data having data fields including data field information. The one or more computer hardware processors are further configured to receive user input identifying a column of the data, and determine data field information to modify for at least some of the data fields of the identified column. The one or more computer hardware processors are further configured to execute the computer-executable instructions to generate and cause display of an indication of a proposed change action to modify the determined data field information, and in response to a user input indicating a selection of the indication of the proposed change action: cause update of the presentation of the data based on the change action to modify data field information in data fields of the identified column of the data, and store a log of each change action.

Such a system may include one or more of the following other features in various embodiments, or may include other features. In some embodiments, the one or more computer hardware processors are further configured to execute the computer-executable instructions to iteratively: receive user input identifying a column of the data, determine data field information to modify for at least some of the data fields of the identified column, and generate and cause display of an indication of a proposed change action to modify the determined data field information. In some embodiments, the one or more computer hardware processors are further configured to execute the computer-executable instructions to iteratively, in response to a user input indicating a selection of the indication of the proposed change action, cause update of the presentation of the data based on the change action to modify data field information in data fields of the identified column of the data, and store a log of the change action. In some embodiments, the one or more computer hardware processors are further configured to execute the computer-executable instructions to: access the log, apply each change action stored in the log to the first data set, and save an updated first data set that includes modifications made by each change action. In some embodiments, the one or more computer hardware processors are further configured to execute the computer-executable instructions to: access the log, apply each change action stored in the log to a second data set; and save an updated second data set, the updated second data set including modifications made by each change action. The data set that is modified by the change actions indicated in the log may be large data sets that may contain tens of thousands, hundreds of thousands, millions or even hundreds of millions (or more) of rows of data.

In some embodiments of such systems, the change action includes modifying the data field information to at least one of: changing the spelling of a word; changing the case of letters; deleting a space; adding a space; deleting a period, comma, semi-colon, or colon; or adding a period, comma, semi-colon, or colon. In some embodiments, the change action may comprise searching a plurality of the data fields to identify data fields that include first information, and in the identified data fields replace the first information with second information. The data fields may be configured to be of a data type, and wherein the change action includes changing the data type of at least one data field. In some embodiments, the change action includes concatenating at least one alphanumeric character or punctuation to information in a plurality of data fields.

In some embodiments of such systems, determining data field information to modify includes determining errors in information in the data fields of the identified column by analyzing the information in the data fields according to associated criteria to determine erroneous information in the data fields. In some embodiments, determining data field information to modify includes causing presentation of information in a plurality of data fields in numerical, alphanumerical or graphical formats. In some embodiments, determining data field information to modify includes filtering information in data fields to identify selected data fields to modify the information therein. In some embodiments, determining data field information to modify includes filtering information in data fields to determine selected data fields, and causing presentation of the information in the selected data fields on a user interface. In some embodiments, determining data field information to modify includes filtering information in data fields to determine selected data fields, and causing presentation of the information in the selected data fields on a user interface.

Another innovation includes a method of preparing tabular representable data for further processing. In various embodiments, the method includes accessing a stored first data set representable in a tabular rows and columns format, causing presentation of data on a display device, the displayed data being a portion of the first data set, the presentation of the data including a plurality of columns of data, each of the columns of data having data fields including data field information, receiving user input identifying a column of the data, determining data field information to modify for at least some of the data fields of the identified column, generating and cause display of an indication of a proposed change action to modify the determined data field information, in response to a user input indicating a selection of the indication of the proposed change action: cause update of the presentation of the data based on the change action to modify data field information in data fields of the identified column of the data; and store a log of each change action, wherein the method is performed by one or more computer hardware processors configured to execute computer-executable instructions on a non-transitory computer storage medium.

Such a method may include one or more of the following other features in various embodiments, or may include other features. In some embodiments, the method of comprises iteratively, receiving a user input identifying a column of the data, determining data field information to modify for at least some of the data fields of the identified column, and generating and causing display of an indication of a proposed change action to modify the determined data field information. In some embodiments, the method further comprises, in response to a user input indicating a selection of the indication of the proposed change action: causing an update of the presentation of the data based on the change action to modify data field information in data fields of the identified column of the data, and storing a log of the change action. In some embodiments, the method comprises accessing the log, applying each change action stored in the log to the first data set, and saving an updated first data set that includes modifications made by each change action. In some embodiments, the method comprises accessing the log, applying each change action stored in the log to a second data set, and saving an updated second data set, the updated second data set including modifications made by each change action.

In some embodiments, the change action includes modifying the data field information by at least one of: changing the spelling of a word; changing the case of a letter; deleting a space; adding a space; deleting a period, comma, semi-colon, or colon; or adding a period, comma, semi-colon, or colon. In some embodiments, the change action comprises searching a plurality of the data fields to identify data fields that include first information, and in the identified data fields replace the first information with second information. In some embodiments of such methods, the data fields are configured to be of a data type, and wherein the change action includes changing the data type of at least one data field. In some embodiments of such methods, the change action comprises concatenating at least one alphanumeric character or punctuation to information in a plurality of data fields. In some embodiments, determining data field information to modify comprises determining errors in information in the data fields of the identified column by analyzing the information in the data fields according to associated criteria to determine erroneous information in the data fields. In some embodiments, determining data field information to modify comprises causing presentation of information in a plurality of data fields in numerical, alphanumerical or graphical formats. In some embodiments of such methods, determining data field information to modify comprises filtering information in data fields to identify selected data fields to modify the information therein. In some embodiments of such methods, determining data field information to modify comprises filtering information in data fields to determine selected data fields, and causing presentation of the information in the selected data fields on a user interface. In some embodiments of such methods, determining data field information to modify comprises filtering information in data fields to determine selected data fields, and causing presentation of the information in the selected data fields on a user interface.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, the design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-series data and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, averages, correlations, and other statistical information. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 2 illustrates an example of data arranged in a tabular (or data table) structure that may be used in the system illustrated in FIG. 1.

DETAILED DESCRIPTION

Overview

Figure 1:
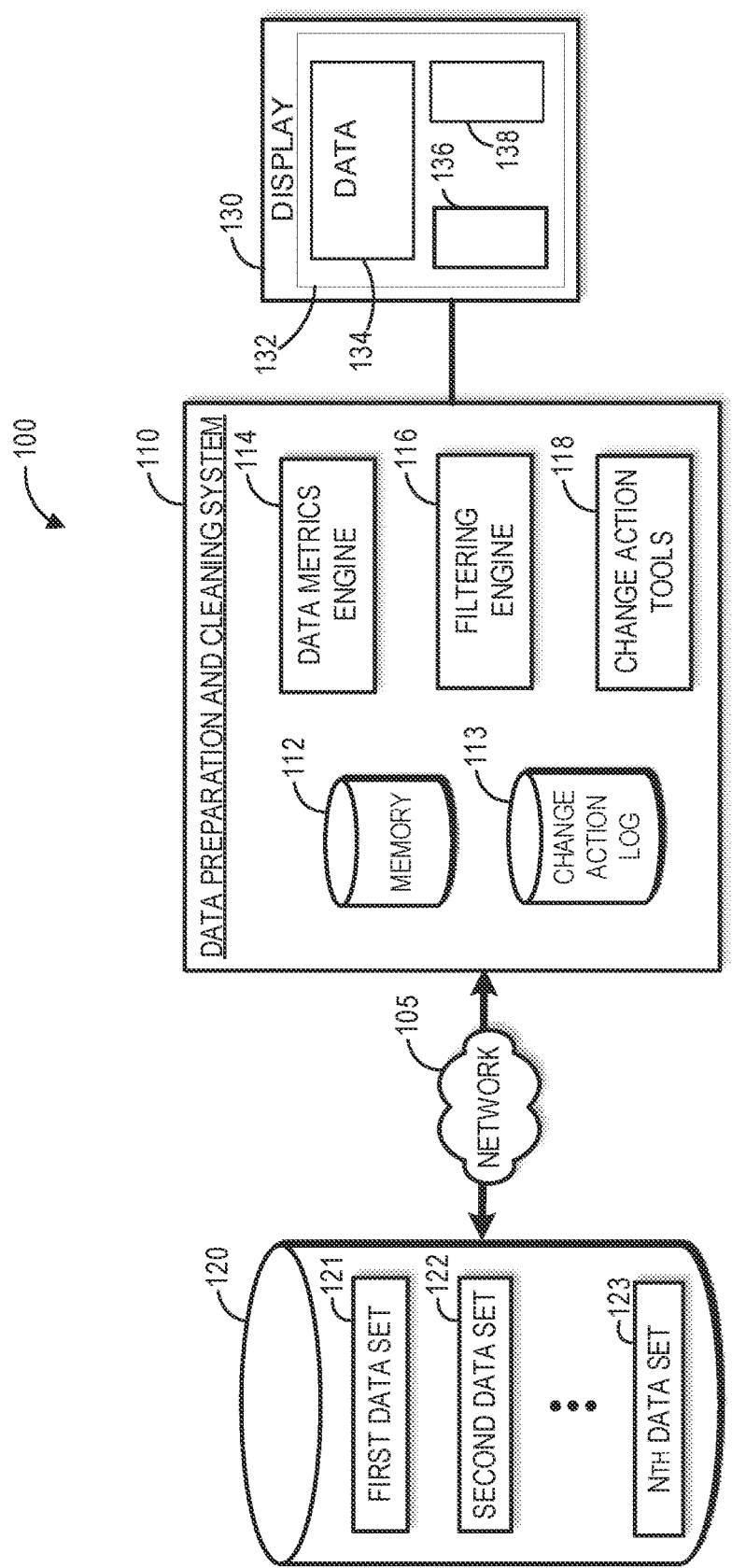
FIG. 1 illustrates an example of a schematic of an overview of an embodiment of a system for accessing stored data that is representable in tabular format, displaying at least a portion of the accessed stored data, reviewing the data to determine modifications to make to at least some values in data fields, and storing a log of the modifications.

Large data sets representable in tabular form may have dozens, or even hundreds, of columns and millions or hundreds of millions (or more) of rows of data. Often, the generation of the data set involves receiving information that was entered into many different computers by a many people (e.g., thousands, tens of thousands, or millions). Not surprisingly, such data sets include errors, for example, misspelled words, erroneous white spaces, incorrect placement of punctuation, incorrect data types, duplicate information (e.g., double entry), and inconsistent information.

At least due to the sheer size of the data set, manually correcting all of the errors in the data set is effectively an impossible task. Even if the errors could be identified, manually correcting all the errors would be extremely time-consuming, and overburden resources for data sets containing hundreds of millions of rows of data. However, if the data is not corrected, thousands of errors could occur during subsequent processing of the data, which would slow down or stop the processing, and it could also result discarding important data due to its inconsistencies. In addition, even if one large data set is corrected, second large data set will have similar problems and manual corrections would again be required to each incorrect data field.

A user interface-based software tool for cleaning or preparing tabular data for further analysis. As used in reference to this functionality, "cleaning" and "preparing" are broad terms that individually and collectively refer, for example, to (i) correcting values of data fields, and (ii) otherwise manipulating or changing values of data fields, (iii) removing or adding data fields, row, or columns, and (iv) manipulating rows and columns to serve future use of the data, for example analysis, joining, visualization, or presentation. The software tool includes pre-analysis of data in a data set in response to selection of a column of tabular data. The pre-analysis depends on a type of data of the column. The functionalities of the software tool enable rapid implementation of cleaning or preparing operations as defined in the pre-analysis.

The software tool can further include functions for various modifications to the data. All changes made to the tabular data and tracked, and the software tool may apply similar changes to other data sets. For example, the tool can first create changes that are made while reviewing a representative portion of the large data set (that may have millions or hundreds of millions of rows of data). Such changes may include, for example, one or more of removing whitespace, changing data types, changing "periods" to "commas" or vice versa, finding and replacing certain data, and the like, and these changes are saved. Then, similar changes may be applied to the large data set, or another data set. Additional functionality includes the ability for the user to traverse back through the changes that have been made to start a new thread of changes, or to perform new analysis.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms.

Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types.

Property Value: The value associated with a property, which is of the type indicated in the property type associated with the property. A property may have multiple values.

Cleaning: As used herein, "cleaning" is a broad term that refers to changing information or a value, that is in data fields, to put the information or value in a proper (e.g., expected) condition for subsequent processing. For example, changing information that is in a data field to correct an error in the information, such as changing the information to be of an expected format, length, case, or contain certain alphanumeric characters or symbols. In one example, in a data field that contains (as the information) an email address an "@" symbol may be expected and if such a symbol is not present, the information in the data field can be changed to reflect a proper email address, or the information may be deleted. In another example, if only lowercase alphanumeric characters are expected in a data field, but in the data field are uppercase alphanumeric characters due to improper entry of the information, the information in the data field can be "cleaned" by changing the uppercase alphanumeric characters to lowercase alphanumeric characters. In another example, if the information in a data field is expected to be of a certain length (e.g., a certain number of alphanumeric characters) and more or less of the merit characters are found in the data field, the information may be changed to then reflect the correct number of alphanumeric characters, and thus be deemed "cleaned."

Preparing: As used herein, "preparing" is a broad term that refers to changing information or a value that is a data field to put the information or value in a desired condition for subsequent processing. In some cases, information in a data field may not be incorrect per se (for example, be of the wrong case, length, be misspelled, wrong alphanumeric character type, etc.) but a user may want to change the information in certain data fields to be more consistent, or normalize the data to use certain terminology, for example based on the subsequent use of the data. In one example, where users entered information relating to roadways, different terms such as "road," "highway," "drive," "street," "avenue," and the like may have been properly entered, but subsequently a user wants to designate all of such items information as a "road" for a certain application or use of the data, and thus the information may be "prepared" by selecting all the data fields with such terms as "road," "highway," "drive," "street," and "avenue" and setting all of the selected data fields to include the information "road." "Preparing" and "cleaning" as used herein, may be used interchangeably as they both refer to changing information or values that is in data fields to prepare the information for additional or subsequent processing.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

FIG. 1 illustrates an example of a schematic of an overview of an embodiment of a system 100 for accessing stored data that is representable in tabular format, displaying at least a portion of the accessed stored data, reviewing the data to determine modifications to make to at least some values in data fields, and storing a log of the modifications. In this example, the system 100 includes a data preparing and cleaning system 110 coupled to a memory component 120 via a network 105. The data preparing and cleaning system 110 is also in communication with the display 130. For ease of reference, examples of a data preparing and cleaning system 110 can be referred to herein as a "data preparation system" 110.

Some functionality that can be included in a data preparation system 110 is illustrated in the example of FIG. 1. The data preparation and cleaning system 110 can access data sets, or large data sets, (e.g., first data set 121, second data set 122, Nth data set 123) that are stored in the memory component 120, via the network 105. All operations of determining data metrics (e.g., using a data metrics engine 114), filtering (e.g., using a filtering engine 116), and changing information in data fields (e.g., using change action tools 118) are performed on an entire data set.

A data set may include information that is representable in a tabular format that includes a number of columns and numerous rows of data. In some examples, the number of rows may be tens of thousands, hundreds of thousands, millions, tens of millions, hundreds of millions, billions, or more. Such large (or "full") data sets may be unwieldy, if not impossible (or nearly so), to efficiently analyze the information contained therein, determine errors in the information, and/or such that it will be more suitable for subsequent processing of the large data set.

The data preparation and cleaning system 110 may also include a data metrics engine 114 which is configured to generate certain types of metrics (or "data metrics") of information in data fields that can be selected during processing. The data metrics are designed to provide a user detailed insight of the types of information that is contained in the data fields. For example, a column of the data 134 that is displayed on display 130 may be selected by a user, and the data metrics engine 114 accesses information in the data fields of the selected column and prepares predetermined types of metrics on that information. The pre-determined types of metrics may include for example, for the data fields selected in the column, how many of data fields have information (or values) that are "normal" (e.g., not containing a null value or white space), are a null value, are empty, need to be trimmed (e.g., because they are the wrong length or have a leading or trailing space), are numbers, are alphanumeric characters, are uppercase characters, are lowercase characters, or are a mix of uppercase and lowercase characters. Additional predetermined types of metrics, or different pre-determined types of metrics, may also be calculated in different embodiments, and may in-part depend on the data being analyzed. In some embodiments, different data metrics are calculated based on the type of column selected. For example, if the data fields in a particular column are supposed to be include an email address, the data metrics may be configured to indicate how many of the rows do not include an "@" symbol, thus indicating the information is not an email address. In another example, if the data fields of a column include a telephone number in the United States, the data metrics may be configured to indicate how many fields have exactly five numbers, how many have exactly nine numbers, and many fields have either five or nine numbers, thus providing an indication to a user on some particular differences in the data.

To determine these metrics, the data metrics engine 114 may execute one or more sets of computer hardware processor-executable instructions, that may depend on what type of data field is selected. The determined metrics may be rendered on the display 130 in a data metrics sub-window 136 of a user interface 132. Functionality of the data metrics engine 114 will be described in more detail in reference to FIGS. 6-10.

The data preparation and cleaning system 110 may also include a filtering engine 116 which is configured to "filter" information of the data to be displayed to a user in a data portion 134 of the user interface 132, based on received input from a user. For example, once a column of data that is shown on display 130 has been selected by a user indicating that the data fields of the selected column are being considered for change to prepare the data field for subsequent processing, the filtering engine 116 may receive an input from a user to select for manipulation and/or display only the data fields of the selected column that meet certain criteria. For example only the data fields of the selected column that contain a certain word, alphanumeric character, symbol, or other commonality. A user may use the filtering engine 116 to review and analyze the information in the data fields of a selected column to determine if the information contains problems, inconsistencies, or errors, and needs to be modified.

The data preparation and cleaning system 110 may also include change action tools 118 which allow a user to modify information in one or more of the data fields of the selected column. The change action tools 118 may include any number of tools (functionality) for finding and modifying information in data fields, including for example a find and replace tool, a keep or rename tool, extract tool, a new value tool, and a map tool. Additional information on the functionality of the change action tools is discussed in reference to FIGS. 6, 7 and 9.

The data preparation and cleaning system 110 also includes a computer memory component 113 that is configured to store information indicating the types of changes that were made to the data set. The stored information of the changes is referred to herein as a "change action log." In operation, a user may analyze the large data set and determine a number of changes that should be made to the large data set to clean or prepare the large data set for subsequent processing. In one example of a change, the change action log may indicate to change the information in a data field of a certain column of data to replace each instance of the word "street" or "avenue" with the word "road." In another example of a change, the change action log may indicate to change the information in a data field of certain column of data to only include lowercase letters, that is, if the information contains an uppercase letter change it to a lowercase letter. In another example, a change may indicate to trim data fields containing ZIP codes of more than five numbers to just the first five numbers. The change action log does not include the actual changes that are made to information in each of the data fields. That is, the change action log is not a revised version of the large data set being evaluated. Instead, it is a log of the actions that are to be performed to change information in the data fields of the large data set to correct errors and inconsistencies, and to modify the information in the data fields of the large data set to be more suitable for subsequent processing, as determined by the user performing the evaluation. Thus, the change action log can be used to implement changes to the large data set. Also, a change action log that was generated based on a first large data set may be used to implement changes in the information of a second large data set that may need the same type of changes.

FIG. 2 illustrates one example of on embodiment of data that can be cleaned and prepared using the system illustrated in FIG. 1. In other embodiments, other suitable arrangements of the data are also possible. The data illustrated in FIG. 2 is arranged in a tabular (or data table) structure 200 that may be used in the system illustrated in FIG. 1. In a tabular data arrangement, the data is arranged in a number of rows and columns. Every row of the data set has the same set of column headers. For data integrity, tabular data should not have "ragged rows" that is, rows that are lacking information for particular column. Typically, if any row is lacking information for a particular column, a "missing" value may be stored in that cell, which in some embodiments may be, for example, a null value, a space, or some other value that will be recognized as indicating the value is missing (i.e., a value that is not normally a value indicative of data for that column).

The tabular data illustrated in FIG. 2 includes a number of columns 204 and a number of rows 208. Each of the columns 204 includes a data field 206 corresponding to each row 208. A full data set may include millions or more of rows. Displayed data may still include all of the columns 204 but only a portion of the rows 208. This description is provided for the purpose of providing an example of a data set and is not intended to limit the arrangement of data to a tabular data model.

Figure 3:
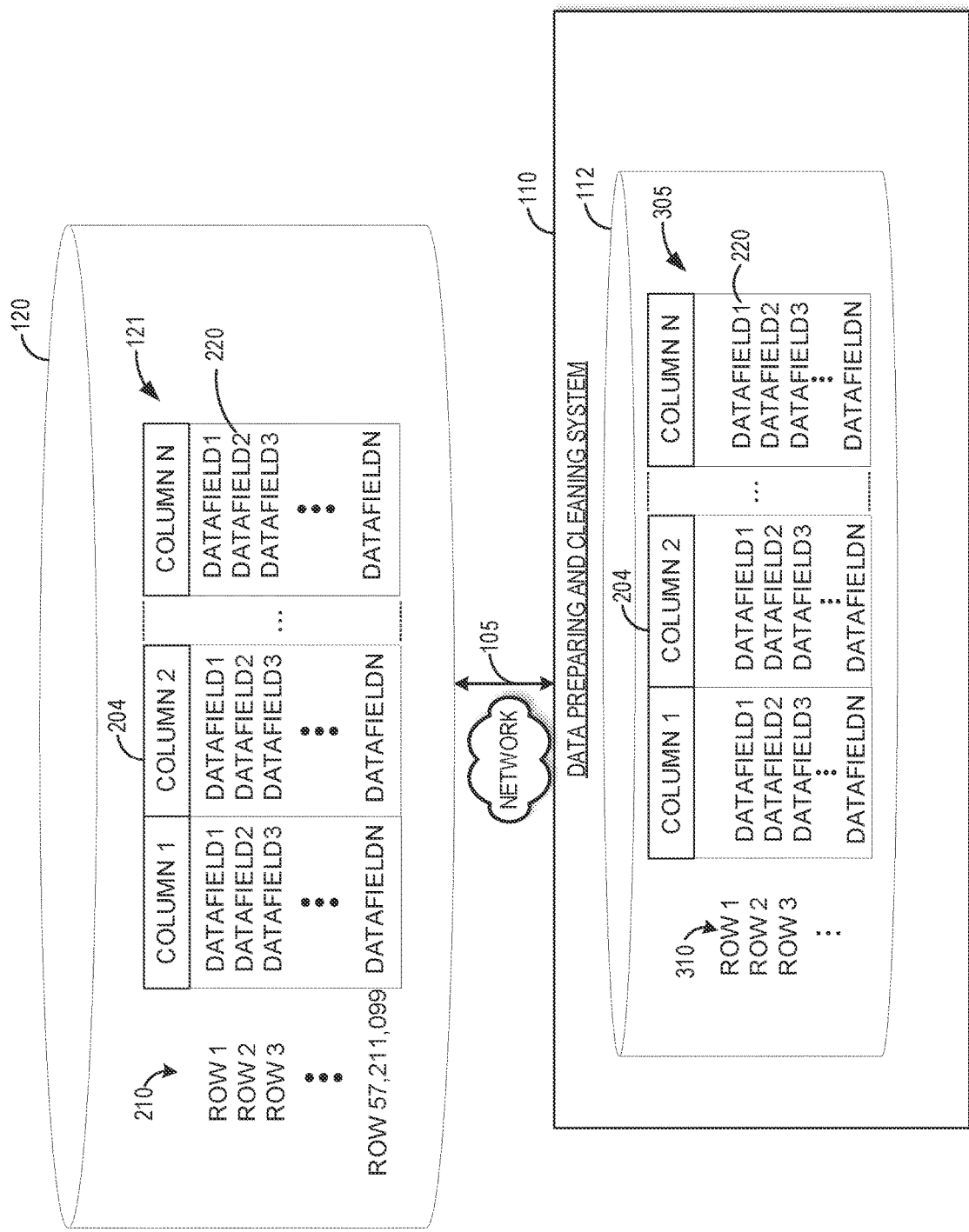
FIG. 3 illustrates an example of a full data set (that may include tens of millions of rows of data) stored on a memory component and the data subset (which is a portion of the first full data set and includes tens of thousands of rows of data) that may be communicated over a network to the data preparing and cleaning system for determining the cleaning and preparing operations that will be used to clean and prepare the full data set.

FIG. 3 illustrates one example of a full data set 121 stored on a memory component 120 and a data 305 of the data set 121 that may be communicated over a network 105 to the data preparing and cleaning system 110 for determining the cleaning and preparing operations that will be used to clean and prepare the full data set 121. The full data set 121 is arranged in tabular form, and includes columns 204 and rows 210. In this example, the full data set 121 includes 57,211,099 rows of data. All of the rows 310 in the data 305 are rows in the full data set 121.

Advantageously, the present disclosure allows users to interact and analyze electronic data in a more analytically useful way. Graphical user interfaces (for example, as described in reference to FIG. 6) provide data metrics and allow a user to visualize and determine otherwise difficult to define relationships and patterns between data. In the example of a system performing numerous operations for cleaning and preparing a data set for further processing, a graphical user interface can display portions of the data set, provide metrics describing the information in data fields of the data set, filter the data set to display portions of the data set, and modify the information in the data set to correct errors, remove inconsistencies, and otherwise prepare the data for further processing or analysis. This allows a user, through the user interface, to quickly and easily review and modify data. The present disclosure allows for easier comparison of data input inconsistently by a number of different people. The present disclosure also allows faster analysis of data sets by allowing quick and accurate access to selected portions of the data sets. Without using the present disclosure, quickly selecting, displaying, and analyzing large data sets, and cleaning and preparing the large data sets for subsequent processing, would be virtually impossible given the size and diversity of many users' present databases, (e.g. excel spreadsheets, emails, and word documents).

Figure 4:
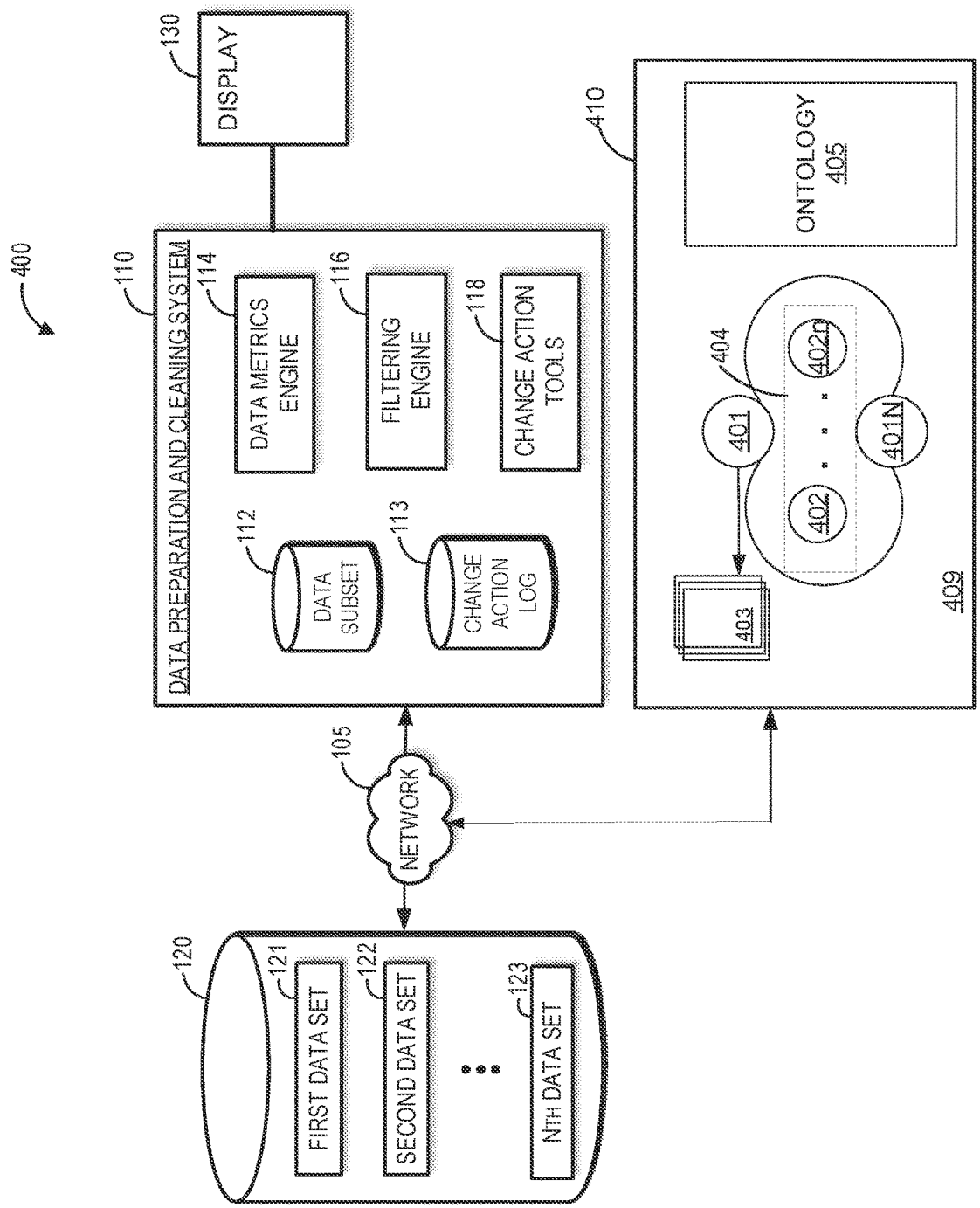
FIG. 4 illustrates an embodiment where a system is used to prepare and clean a full data set, and then the cleaned/prepared full data set is provided to an ontology-based database system for loading into an ontology-based database for further processing.

FIG. 4 illustrates an embodiment where a system 400 used to prepare and clean a full data set, and then the cleaned/prepared full data set is provided to an ontology-based database system for loading into an ontology-based database for further processing. As illustrated in FIG. 4, the system 400 includes the memory component 120, the data preparing and cleaning system 110, and the display 130 illustrated and described in reference to FIG. 1. The memory component 120 communicates with the data preparing and cleaning system 110 via network 105, for example, to provide the data preparing and cleaning system 110 with information of the data set.

The data preparing and cleaning system 110 determines operations to clean and prepare a data set (for example, first data set 121), the data set can be cleaned and prepared in accordance with the operations that were saved in the change action log 113. As result of the data preparing and cleaning operations, the integrity of the data set should be at a high level (for example, it should contain no data errors/inconsistencies, or nearly no errors/inconsistencies). In some examples, the cleaned and prepared full data set can then be provided via network 105 2 and ontology-based database system 410 where the information in the full data set can be stored in an ontology-based database 409 for further processing.

In one embodiment, a body of data is conceptually structured according to an object-centric data model represented by ontology 405. The conceptual data model is independent of any particular database used for durably storing one or more database(s) 409 based on the ontology 405. For example, each object of the conceptual data model may correspond to one or more rows in a relational database or an entry in Lightweight Directory Access Protocol (LDAP) database, or any combination of one or more databases. An ontology 405 may include stored information providing a data model for storage of data in the database4. The ontology 405 may be defined by one or more object types, which may each be associated with one or more property types. At the highest level of abstraction, data object 401 is a container for information representing things in the world. For example, data object 401 can represent an entity such as a person, a place, an organization, a market instrument, or other noun. Data object 401 can represent an event that happens at a point in time or for a duration. Data object 401 can represent a document or other unstructured data source such as an e-mail message, a news report, or a written paper or article. Each data object 401 is associated with a unique identifier that uniquely identifies the data object within the database system.

Different types of data objects may have different property types. Each property 403 as represented by data in the database system 410 may have a property type defined by the ontology 405 used by the database 409. Objects may be instantiated in the database 409 in accordance with the corresponding object definition for the particular object in the ontology 405. Each link 202 represents a connection between two data objects 201. In one embodiment, the connection is either through a relationship, an event, or through matching properties. A relationship connection may be asymmetrical or symmetrical. In one embodiment, when two data objects are connected by an event, they may also be connected by relationships, in which each data object has a specific relationship to the event. Each data object 401 can have multiple links with another data object 401 to form a link set 404. Each link 202 as represented by data in a database may have a link type defined by the database ontology used by the database.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.). Using a data preparing and cleaning system prior to importing data into an ontology-based database system provides the advantages of the dynamic ontology with the assurance that the data input is consistent, has no or minimal errors, and/or has been pre-processed in accordance with certain data analysis criteria to place the input data in better condition for further analysis.

Figure 5:
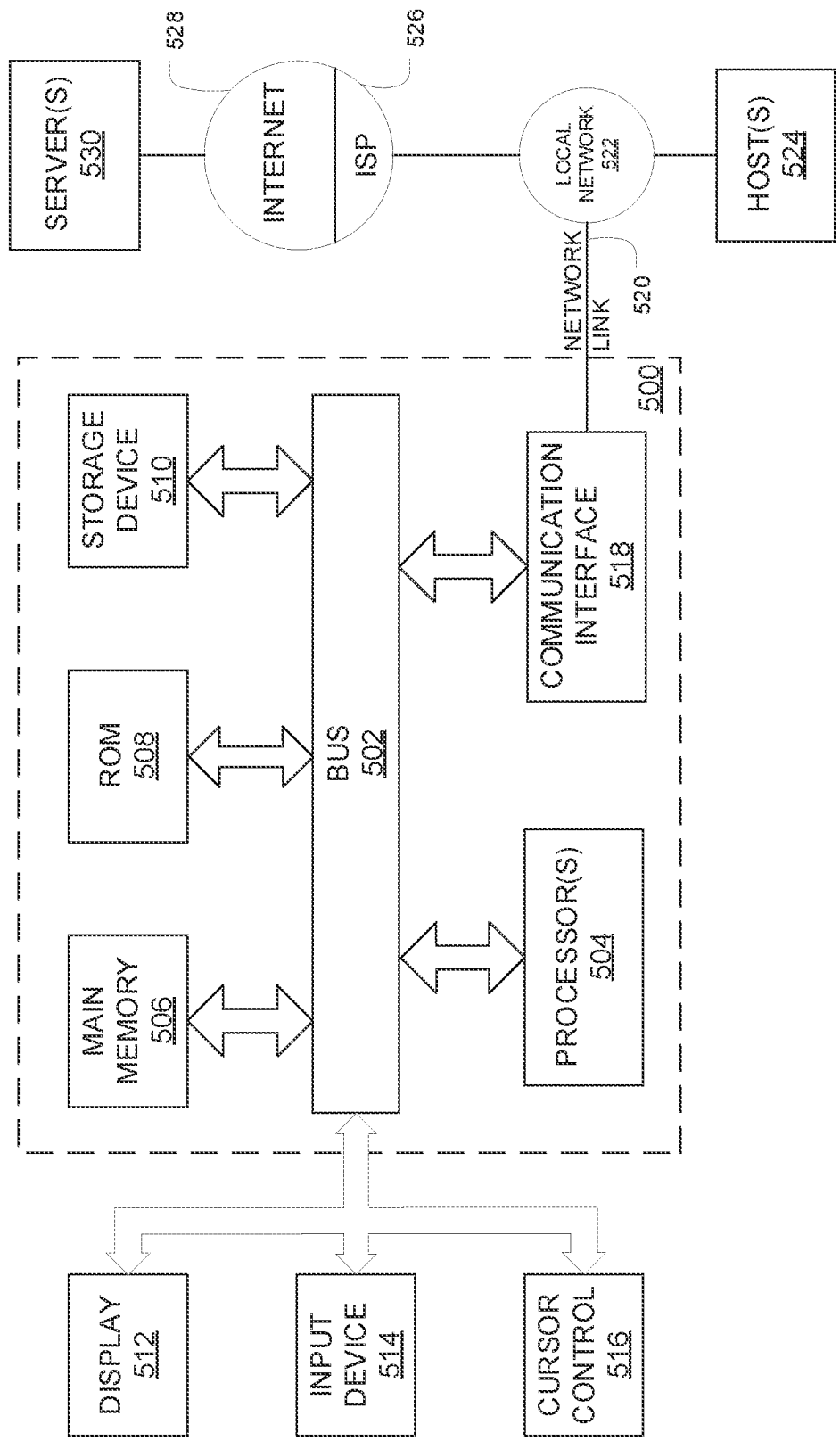
FIG. 5 is a block diagram illustrating a computer system to perform cleaning and preparing data of a large data set.

FIG. 5 is a block diagram that illustrates a computer system 500 upon which various embodiments may be implemented. That is, in various examples, the data preparation and cleaning system 110 may be implemented as computer system 500. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Figure 6:
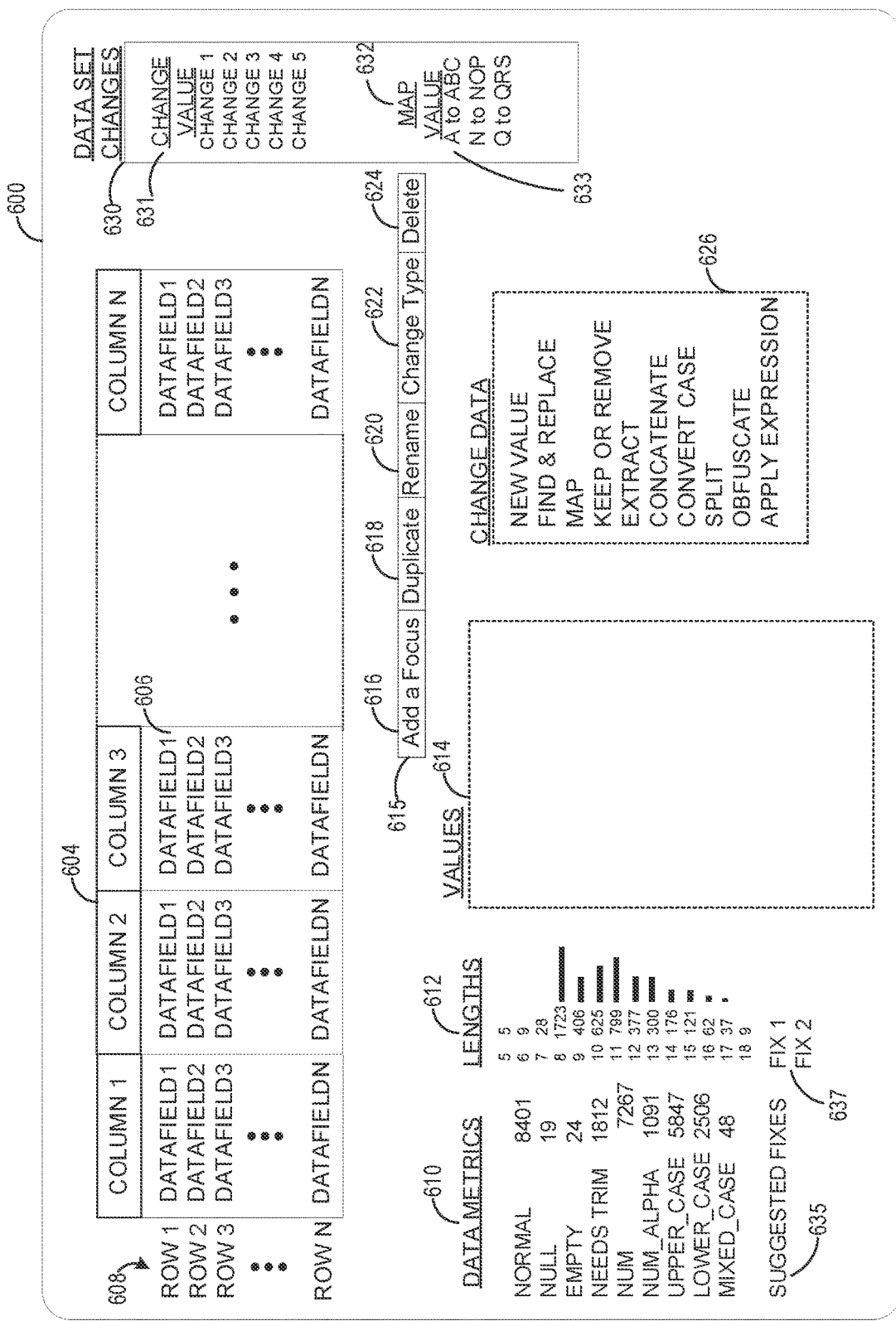
FIG. 6 is an example user interface for cleaning and preparing data.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The main memory 506 may, for example, include instructions to implement a user interface as illustrated in FIG. 6, calculate data metrics, allow a user to filter data and change data in data sets, and store information indicting the operations performed to clean and/or prepare data to a log as described in FIGS. 1 and 6-10, the data being stored in some examples in data objects as defined by an ontology, as described in reference to FIGS. 2-4.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Accordingly, in some embodiments, of the computer system 500, the computer system comprises a first non-transitory computer storage medium storage device 510 configured to at least access a first data set representable in a tabular rows and columns format, cause presentation of a data on a display device, the data being a portion of the first data set, the presentation of the data including a plurality of columns of data, each of the columns of data having data fields including data field information, receive user input identifying a column of the data, determine data field information to modify for at least some of the data fields of the identified column, generate and cause display of an indication of a proposed change action to modify the determined data field information, and in response to a user input indicating a selection of the indication of the proposed change action, cause update of the presentation of the data based on the change action to modify data field information in data fields of the identified column of the data and store a log of each change action.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 6 is an example user interface 600 for cleaning and preparing information in a large data set for subsequent processing by generating a change action log that includes information of changes to be made on the large data set. In this example, user interface 600 is displaying data in a tabular format that includes a number of columns 604 and a number of rows 608 on an upper portion of the user fit interface 600. Each of the columns 604 includes a data field 606 corresponding to each row 608. Even though the data is only a portion of a larger data set, typically the data will still include a plurality of columns and hundreds or thousands of rows, such that the user interface 600 cannot display all of the data fields 606, and therefore some of the rows (and perhaps only some of the columns) are displayed at any one time.

The user interface 600 in FIG. 6 is configured such that when a user selects a portion of the data set, for example, a column 604, a plurality data metrics 610 are generated for the information in the data fields of the selected portion (e.g., the selected column). The plurality of data metrics 610 can include predetermined queries to provide to a user insight on the information that is in the data fields. Thus, the data metrics are designed to provide information that a user may find interesting to help a user find and correct errors or inconsistencies in the data set. When data is selected, predetermined queries are run on the selected data. As a user makes changes to data, the data metrics can be run again to show the results of the changes. For example, if the data metrics first indicate extra spaces in a number of data fields, as these fields are identified and changed to remove the extras spaces, the data metrics 610 are re-calculated such that the user can see the results of the changes, and thus help the user determine if there is additional work to do. In some examples, the data metrics that are generated can be predetermined based on the type of data fields that are in the selected column. In an embodiment, the data preparation and cleaning system 110 is configured to apply rules to automatically detect potential data quality issues. For example, common incorrect spelling of certain words, or a data entry error where one word is often used instead of the correct word. To facilitate correcting these issues, a portion of a user interface can display suggested fixes. FIG. 6 illustrates an example of displaying suggested fixes 635 in interface 600, along with a list of the fixes 637, e.g., FIX 1, FIX 2. To easily make the suggested correction, a user can provide an input to the interface 600 by selecting one or more of the suggested fixes. Once the input is received, the data preparation and cleaning system 110 can document to make the suggested correction to the data by including information, relating to the selected one or more fixes, in the change action log 113. In an embodiment, the fixes on the list are displayed with a color indicator and/or an icon, so they are more visible to the user and highlight determined importance. In some embodiments, more than one color indicator and/or icon are used. In some embodiments, different colors are used to indicate to the user a priority, or likelihood, that the change is desirable (e.g., pink=most strongly suggested change, green=strongly suggested change, yellow=suggested change, etc.). In some embodiments, different icons are displayed to indicate to a user a priority, or likelihood, that the change is desirable.

In this example, data metrics are generated to show the number of various characteristics of the data fields of the selected column. For example, FIG. 6 illustrates the user interface 600 displays the following data metrics 610: NORMAL (not containing a null value or a "white space" (no value)), NULL (containing a null value), EMPTY (only containing white space), NEED TRIM (information in data field needs to shortened, e.g., because it contains a leading or trailing white space, or because it is too long—for example, trimming nine digit zip codes to 5 digit zip codes), NUM (contains all numbers), NUM_ALPHA (contains numbers and alpha-numeric characters), UPPER_CASE (contains all upper case letters), LOWER_CASE (contains all lower case letters), and MIXED_CASE (contains at least one upper case letter and one lower case letter). The data metrics 610 are displayed and updated as a user analyzes and modifies the data to help alert the user of characteristics of data fields in the selected column that may warrant further attention and change. In one example illustrated in FIG. 6, if the data fields in the selected column are supposed to be all lowercase, the data metrics indicating 5847 data fields being all uppercase and 48 data fields being mixed case provide an indication to the user that the case of information in a certain number of data fields needs to be changed.

The user interface 600 also illustrates length metrics 612 that are automatically calculated for the data fields in the selected column. For example, in this case there are 5 data fields have a length of 9, 9 data fields have a length of 6, 28 data fields to have a length of 7, 1723 data fields that have a length of 8, 406 data fields that have a length of 9, etc. If the data fields should all be 8, 9, 10 or 11 characters long, displaying the length metrics allows a user to quickly determine that this is an area where the information in data fields needs to be modified.

The user interface 600 illustrates a values window 614 that is configured to show information in data fields that are of interest to the user during the current operation. For example, when a column is first selected the values 614 can show the information in a number of the data fields of the selected column (e.g., up to 10,000 of the most common values, by default ordered by count, or optionally by value, the idea being to provide to a user the most relevant values). Subsequently, if a user filters or focuses in on certain information in the data fields, or initiates one or more of the tools 615, the displayed values 614 can show certain results of the filter or operations. In the user interface 600 illustrated in FIG. 6, the tool buttons 615 allow filtering and operations on the selected data. In this example, the tools buttons include Add a Focus 616, which provides pop-up menus of a number of filters, for example "begins with [values]," "ends with [values]," or "contains [values]." The tool buttons 615 also include Duplicate 618, which duplicates a selected column, allowing modifications to the information of the duplicated column while keeping the original column data. The tool buttons 615 also includes Rename 620, which renames a column. The tool buttons 615 further include Change Type 622, which changes the type of information in selected data fields. For example, the Change Type 622 tool may be configured to change data fields from a data type of a Boolean (true or false), double (fractional numbers), integer (whole numbers), long (large whole numbers), date (whole days), or timestamps (instants in time) to a data type of a Boolean (true or false), double (fractional numbers), integer (whole numbers), long (large whole numbers), date (whole days), string (e.g., numbers or characters), or timestamps (instants in time). The tool buttons 615 also includes Delete 624, which deletes a row or a column. In other example, other tools or different tool buttons 615 can be included on the user interface 600.

User interface 600 also shows some examples of change action tools 626 that are configured to modify or change information in data fields of the selected column. The change data tools 626 can operate on the entire data set, selected rows, or focused rows of the data set. The change data tools 626 can include a NEW VALUE tool configured to set the value of the selected data fields. The change data tools 626 can also include a FIND & REPLACE tool which is configured to find all the data fields in a selected column that contain certain information (e.g., a word or an alpha-numeric character) and replace it with other information entered by the user. The change data tools 626 also includes a MAP tool configured to change (or map) one or more data value to another data value. For example, change all data values "red delicious" to "apple." Activating the Map tool can cause a new user interface to pop-up which allows multiple entry of mappings to be performed in one map operation. The change data tools 626 also includes a keep or remove tool which is configured to strip out designated alpha-numeric characters, or keep designated alpha-numeric characters.

The change data tools 626 also includes an EXTRACT tool which is as in index update tool which can be used to perform specific indexing of values to index, find and change ("index") values in a data field. For example, the extract tool can be used to extract: a specified substring, a substring between certain values, a substring up to a certain value, keep a first word in a data field, keep a last word in a data field, rename a first word in a data field, rename a last word in a data field, or extract a regular expression. The change action tools 626 also includes a CONCATENATE tool which is configured to add a value(s) to values in a data field (e.g., add an "s" or the word "eyes" to information in a data field. The CONCATENATE tool is also used to join two columns together, for example, for each row join the data in a first column with the data in a second column. The change action tools 626 also includes a CONVERT CASE tool which is configured to change the case of values, e.g., from lower case to upper case, or upper case to lower case. The change action tools 626 also includes a SPLIT tool which is configured to split a column into two columns which can be worked on separately. For example, a column that has information in the data fields that is split by a comma can be split into two columns, one column including the information before the comma and one column including the information after the comma. The change action tools 626 also includes an OBFUSCATE tool configured to mask sensitive values (e.g., for privacy or security reasons), while still allowing them to be analyzed. For example, it can either apply a hashing function (e.g., MD5 or SHA1) to the values, or masks a portion of the value (e.g., replacing all but the last 4 digits of a credit card number with asterisks). This way the values can still be aggregated, or analyzed, by further users/systems without the full original values being visible. Use of obfuscating data is often required in finance/health environments, or in Europe due to the General Data Protection Regulation (GDPR). The change data tools 626 also include an APPLY EXPRESSION tool that is configured to receive user input of custom queries or multi-call expressions.

The user interface 600 illustrated in FIG. 6 also includes a DATA SET CHANGES field 630 that can include a CHANGE VALUE fields 631 and MAP VALUE fields 633. The CHANGE VALUE fields 631 displays an indication of the operations that were done to filter and/or modify the data set. In this example, the CHANGE VALUE fields 631 shows an example of five change operation. The MAP VALUE fields 633 indicate mapping of one data value to another data value. Here, the MAP VALUE fields 633 show three map value operations performed on the data set. The user interface 630 is configured to receive a user selection of a step listed in the CHANGE VALUE fields 631 (e.g., by the user clicking on the listed operation in the CHANGE VALUE fields 631) and revert back to a selected previous step. As these changes are identified, the analytics and data seen by the user reflect these changes. At the end of the analysis, the user can apply the indicated changes to the large data set and for a new data set that incorporates these and other changes for further processing.

In other examples, the user interface 600 can include additional features, or different features, for example, different change data tools 626 or different data metrics 610. All of the above-discussed tools, or other tools that can be provided to a user to clean and prepare the data for subsequent processing, once a user has determined to make the change, the change is stored in the change action log such that it can be used at a later time to make the same changes to the data set from which the data was generated, or to another data set.

Figure 7:
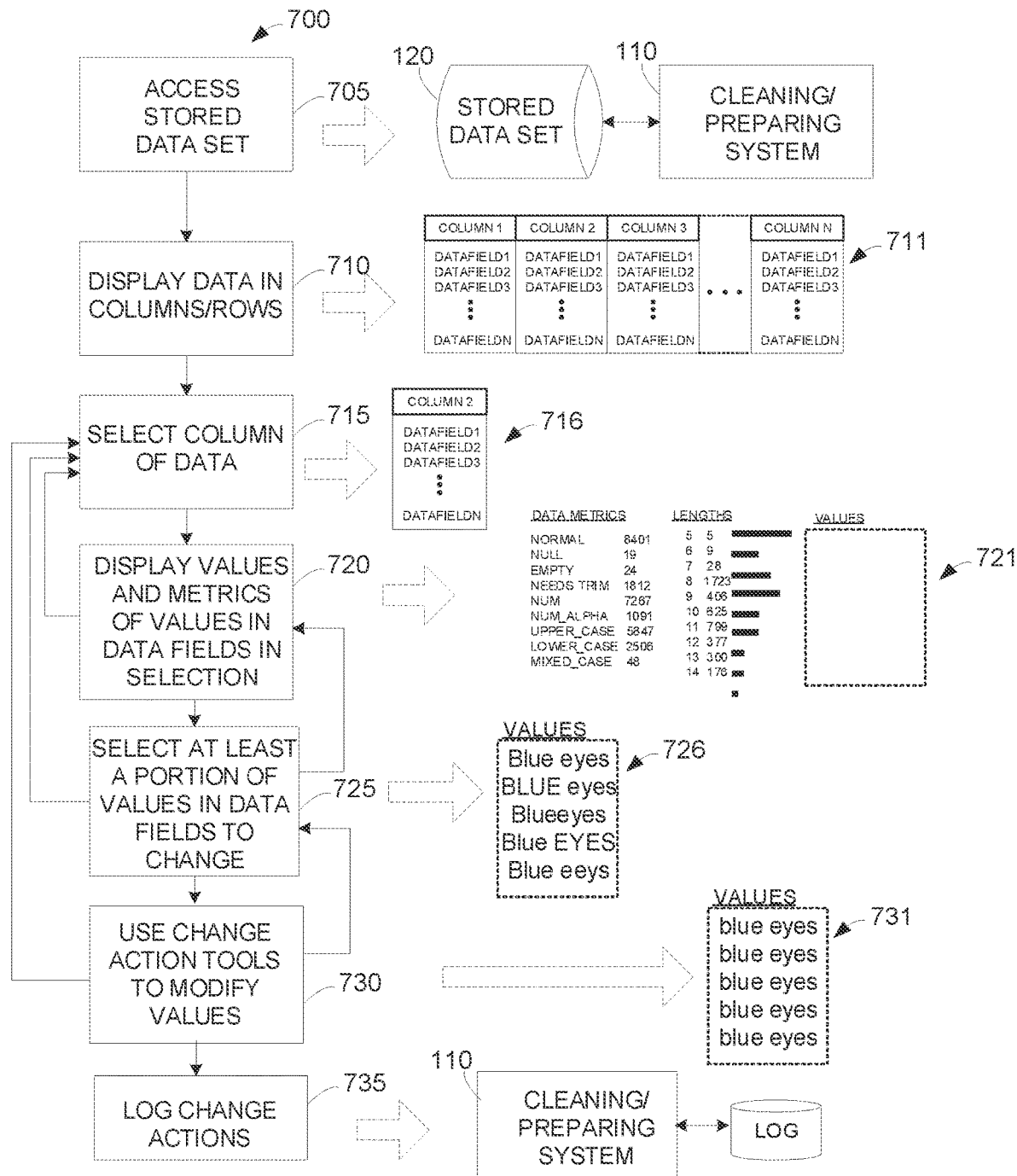
FIG. 7 is a flowchart illustrating an example process and examples of corresponding information displayed on a user interface.

FIG. 7 is a flowchart illustrating an example process 700 and examples of corresponding information displayed on a user interface, for example the user interface 600 illustrated in FIG. 6. At block 705, process 700 begins by accessing a data set, via a network 105 that is stored on memory component 120. The stored data set can be a large data set, for example having millions of rows of data. The process 700 can be a process running on one or more processors of the data preparation and cleaning system 110.

At block 710, process 700 displays a data of the accessed large data set in a number of columns and rows in a user interface on a display. The displayed data 711 will typically be a representative number of columns and rows of the large data set, because the entire data set is too large to display.

At block 715, the process 700 receives a user input that selects a column 716 of the data for further analysis. Selecting a column 716 indicates to the process 700 certain data fields that the user wants to analyze. Accordingly, at block 720, process 700 generates data metrics for the information in all of the data fields of the selected column (i.e., not just the data fields displayed on the user interface). In one example, the data metrics are predetermined. In another example, the data metrics can include predetermined data metrics as well as user defined data metrics, that is, data metrics can be defined by user at the time the data is being analyzed. The data metrics include a plurality of metrics about the type of information that is in the data fields of the selected column. For example, data metrics can include one or more metrics that indicate if the data field contains any information, if the data field contains a null value, if, based on certain predetermined criteria, the data field needs to be trimmed (for example, based on a predetermined character length of the data field), if the data field contains numbers, if the data field contains alphanumeric characters and numbers, if the data field contains only letters, if the letters in the data field are uppercase, lowercase or a mixed case. In other examples, the data metrics can be configured to determine if there is a particular type of punctuation in a data field, for example, a period, a semicolon, a colon, a semicolon, an underscore, a "blank" space, or a symbol (for example an "@" symbol). In some examples, as the user analyzes the data and selects various data fields for further analysis, the data metrics are generated for the selected various data fields. As a user selects analyzes certain information and selected data fields, a representation of the information is displayed in the values window 721.

At block 725, the process 700 selects a portion of information in the data fields to change. The user can select the portion of information using one of the tools 615 or one of the change action tools 626. For example, as illustrated in FIG. 7, the values window 726 shows that information in certain data fields has been selected that includes the characters "blue" in reference to blue eyes. Although the information all contains the characters "blue" the information is inconsistent in its format and there are many variations, for example, "Blue eyes," "BLUE eyes," "Blueeyes," "Blue EYES," and "Blue eeys." Thus, there are differences in the case of the letters, the spelling of eyes, and the spacing between the letters "blue" and "eyes."

At block 730, the process 700 changes the information shown in the values 725 window to be consistent as illustrated in values window 731, such that the information in the data fields is "blue eyes" for each of the data fields. To change the information, a change action tools is used. In this particular example, the find and replace tool can be used to find all of the data fields they contain the letters "blue" in either uppercase or lowercase, and then replaced all of the information in this field with the letters "blue eyes" such that all of the information is now consistent.

Finally at block 735, process 700 stores a record of the changes that have been made into a change action log (e.g., a file). The change action log can be kept locally on the data preparation and cleaning system 110, or it can be stored in other computer memory, for example, in memory 120. The change action log includes information of the types of data changes for cleaning and preparing a data set based on the user's analysis. Subsequently the change action log can be used to change information in a large data set in the same way as the user made changes to the data displayed to the user to correct errors, address inconsistencies, and otherwise prepare the data for further processing. In some uses, the operations in the change action log can be used to implement a processing pipeline where, when an application wants to access part of all of the data in a large data set, the data from the large data set is processed by the operations in the change data log as the application access the data such that the application only access that has been cleaned and prepared based on the operations in the change data log.

Figure 8:
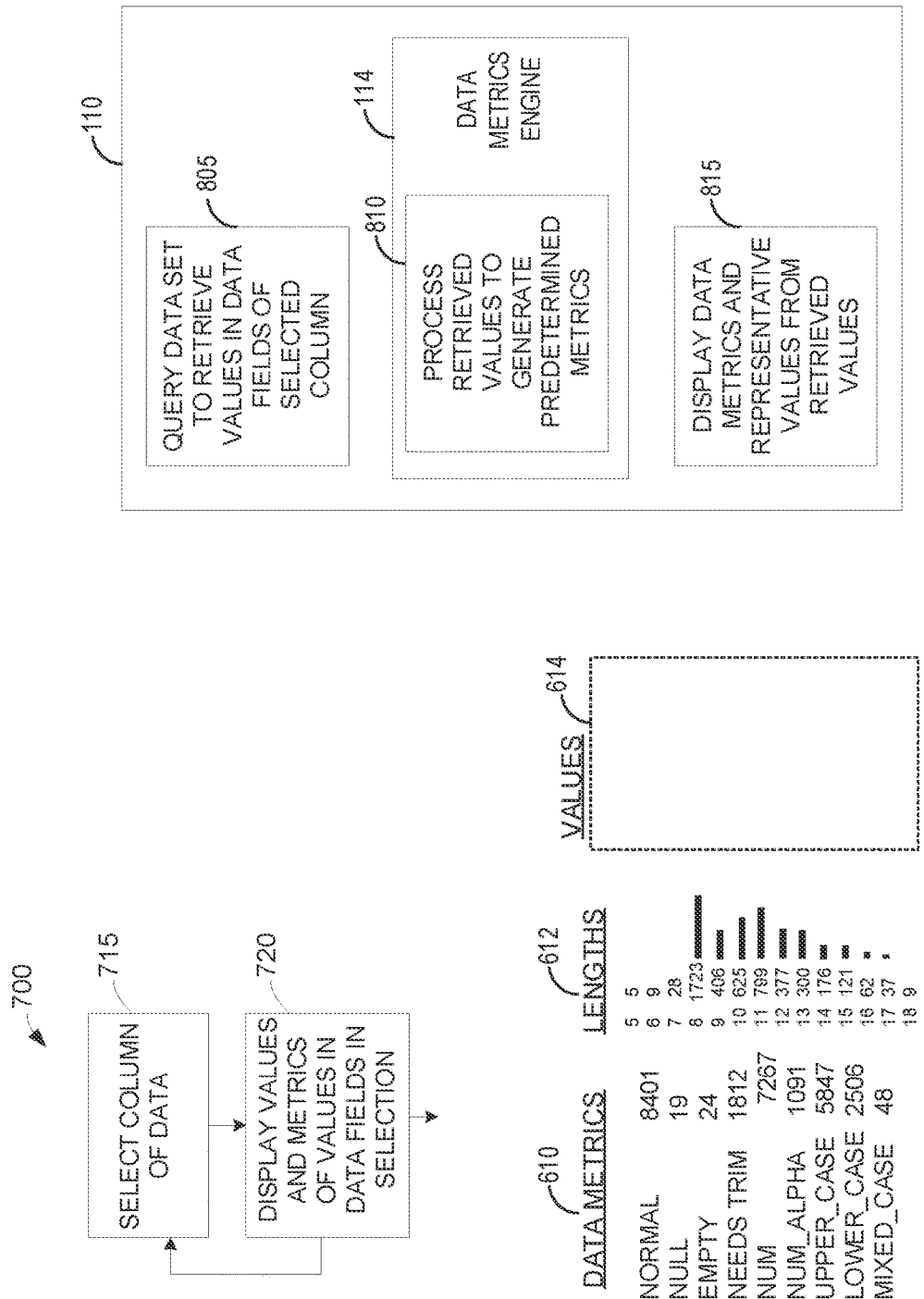
FIG. 8 illustrates an example of functionality relating to selecting a column of tabular data to display and some examples of certain displayed results and an example of corresponding structure and modules to accomplish the functionality.

FIG. 8 illustrates an example of functionality relating to selecting a column of tabular data to display and some examples of certain displayed results and an example of corresponding structure and modules to accomplish the functionality. FIG. 8 shows an example of displaying data metrics having "string" data types in the data fields of the selected column. For different types of data (e.g., string, date/timestamp, numeric, Boolean, array, etc.) different data metrics are displayed. Certain aspects of some of this functionality have been previously described above and should be considered in reference to FIG. 8, for example, process 700 in FIG. 7, and the computer hardware structure in FIG. 5 that can implement the functionality illustrated in FIG. 8.

As illustrated in FIG. 8, at block 715 a user can select a column of the data to analyze. By selecting a column, the user indicates to analyze the data fields in rows corresponding to the selected column. A large data set can include millions or billions of rows or data. The data can include, as an example, thousands or tens of thousands of rows of data. Thus, when a column is selected at block 715, at block 805 a query is made from the data preparation and cleaning system 110 to the stored data set to retrieve a data of the data fields in the selected column. The one or more processors 504 (FIG. 5) can be configured to make such a query.

After a column is selected, at block 720 the process can display a representative information in the data fields in the values window 614. In an embodiment, the representative number of values can include up to ten thousand entries that are the most common information in the data fields of the selected column and provide a user with insight into differences in the displayed information.

Also at block 720, metrics of the values in the data fields of the selected column are calculated and displayed in a data metrics window 610. Data metrics engine 114 of the data preparation and cleaning system 110 can be configured with data metrics generation processes 810 to calculate predetermined data metrics from the retrieved values of the selected data fields. Module 815 of the data preparation and cleaning system 110 includes functionality to display the calculated metrics in the data metrics window 610, and the representative values from the retrieved values in the data in the values window 614. Also, module 815 includes functionality to calculate and display the lengths of the information in the selected data fields in a lengths window 612. The information displayed in the lengths window indicates the character lengths of information in a number of the selected data fields and the number of the data fields that each have that particular length. In the example illustrated in FIG. 8, there are 1723 data fields that have a length of 8.

The particular data metrics 610 are described in further detail in reference to FIG. 6. The data metrics generation processes 810 are dynamic run such that when a user makes a change to data fields to clean/prepare the data, the data metrics can be re-run to then show updated data metrics. This provides a user with a valuable insight in what other types of changes may need to be made to the data. For example, it is likely that in the data fields being examined, it is desired to have consistent values (e.g., upper case or lower case), data of the same length, non-empty data fields, no null values, and consistency in use of alpha-numeric values. As the user analyzes the data fields in a column, and focuses on portions of the data fields making changes to correct inconsistencies and errors, the updated data metrics provide a key to whether or not all of the problems have been addressed because they can be updated after each change the user makes.

As mentioned above, due to the large data set size, typically only a portion of the data set is displayed and analyzed at a time. However, the data metrics are run on the entire data set. This is to ensure that any data problems are identified, which they may not be if the data metrics are only run on a representative portion of the data set.

Figure 9:
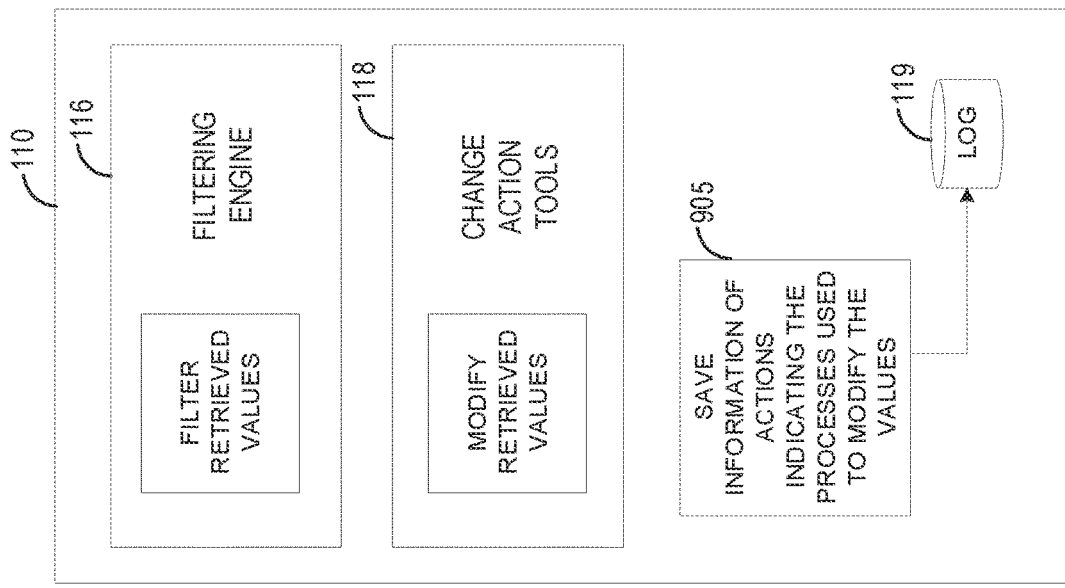
FIG. 9 illustrates an example of functionality relating to selecting information in data fields to modify, modifying the values and making a log of the actions used to modify the data.
Figure 9:
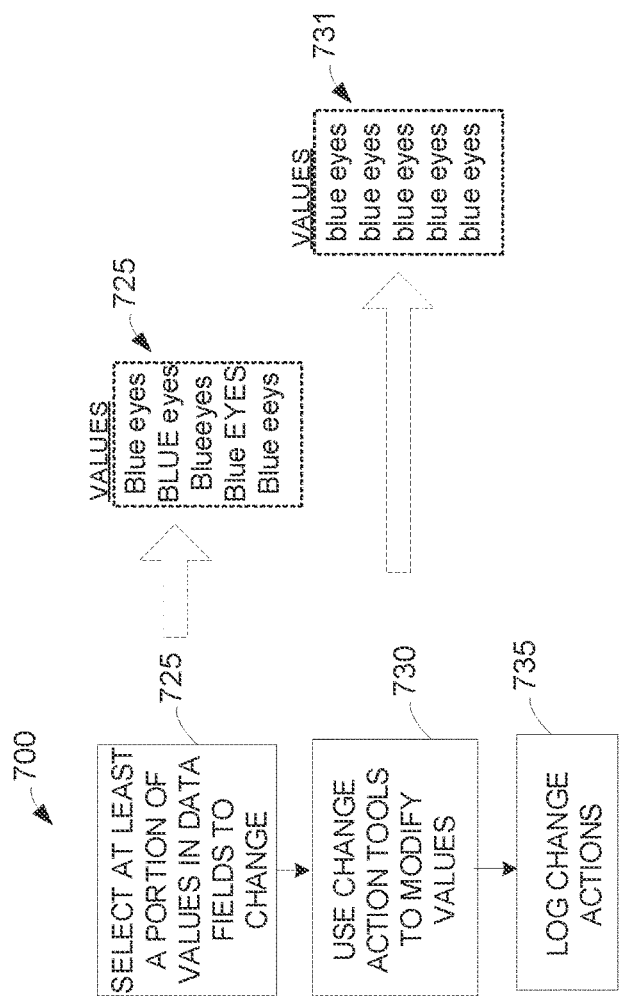

FIG. 9 illustrates an example of functionality relating to selecting information in data fields to modify, modifying the values and making a log of the actions used to modify the data, further describing these aspects that were disclosed in reference to FIG. 7.

As illustrated in FIG. 9, at block 725 a user can implement the process 700 to select at least a portion of values in data fields of a selected column to change. As previously described (e.g., in reference to FIG. 6) the selection of values can be done in many ways, for example, by using one of the tools 615 to apply a filter to the data. In some implementation, such filtering operations can be performed by a filtering engine 116 configured on the data preparation and cleaning system 110. The filtering engine 116 can include computer instructions that are executed by one or more of the processors 504 FIG. 5 of the data preparation and cleaning system 110. The filtering engine 116 is configured to receive a user input for filtering data and filter the data based on the user data, providing a filtered data set 725 for display to the user. In the example in FIG. 9, the data fields of a columns were filtered to select data that includes the values "blue" regardless of being upper, lower or mixed case.

At block 730, a user can implement the process 700 to use a change action tool to modify the values being displayed as a result of the filtering. The data preparation and cleaning system 110 includes a number change action tools 118 that are configured with instructions to modify retrieved values, such as those values retrieved from filtering. In this case, a new value tool can be used to replace the information in the data fields that were a result from the filtering operation with the new values "blue eyes" in each data field, as illustrated in block 731.

At block 735, process 700 records the operations that were performed to change the inconsistent information in block 725 to the consistent information ("blue eyes") in block 731. In this example, the data preparation and cleaning system 110 at block 905 saves the filtering step and the adding a new value step to a change action log 119, which can reside on the data preparation and cleaning system 110, or in other implementations can reside on a computer memory component in communication with the data preparation and cleaning system 110.

Figure 10:
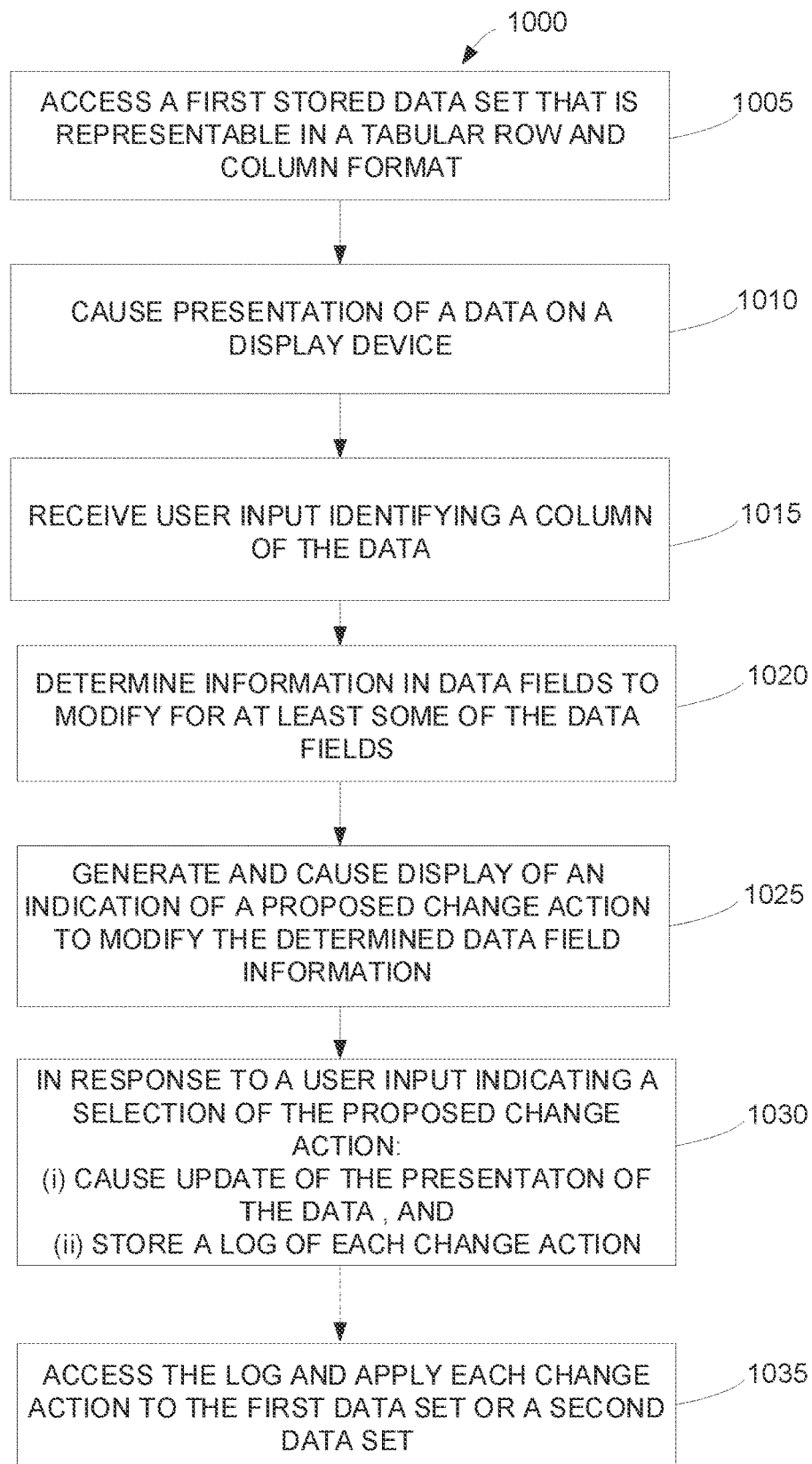
FIG. 10 is a flowchart illustrating an example process for cleaning and/or preparing data.

FIG. 10 is a flowchart illustrating an example of a process 1000 for cleaning and/or preparing data. The described process illustrates certain possible aspects of such operations. However, many other aspects (additional aspects and different aspects) are also possible, for example, implementing the systems and functionality described herein. The process 1000 can be implemented on a data preparation and cleaning system 110 (FIG. 1), and can be performed by one or more computer hardware processors configured to execute computer-executable instructions stored on a non-transitory computer storage medium. At block 1005, the process 1000 accesses a first data set representable in a tabular rows and columns format. The first data set may be a large data set stored on a computer memory component 120 as illustrated in FIG. 1.

At block 1010, the process 100 causes presentation of a data on a display device. The data displayed can be a portion of the first data set, the presentation of the data including a plurality of columns of data, each of the columns of data having data fields that includes data field information.

At block 1015, the process 1000 receives user input identifying a column of the first data set. The user can select a column of data using, for example, an input device 514 or a cursor control device 516 (FIG. 5). At block 1020, the process 1000 determines data field information to modify for at least some of the data fields of the identified column. For example, the process 1000 can receive a user selection of certain data fields to modify through the operation of a filtering tool. Data metrics that the data preparing system generates and display can facilitate determining the data field information to modify.

At block 1025, the process 1000 generates and causes display of an indication of a proposed change action to modify the determined data field information; and for example, a change data tool 626 can be used to determine information in a data field to modify (e.g., using the find and replace functionality or another change data tool illustrated in FIG. 6).

At block 1030, the process 1000 in response to a user input indicating a selection of the indication of the proposed change action, operates to cause an update of the presentation of the data (based on the change action to modify data field information in data fields of the identified column) and stores a log of each change action. The change action log can be stored in a computer memory component on the data preparation and cleaning system 110 as illustrated in FIG. 1, or on non-local computer memory component outside of the data preparation and cleaning system 110. As an optional part of process 1000 (or as part of another process), the process 1000 can access the change action log and apply each indicated data set change to the first data set (the first data set referring to the data set which the data corresponds to). In another example, the process 1000 can access the change action log and apply each indicated data set change to another data set (the "another data set" referring to any other data set where the data changes can be desired.

Many variations and modifications can be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system, comprising:
one or more computer processors configured to execute computer-executable instructions to cause the system to at least:
generate and cause display, on a display device, data arranged in tabular format including a plurality of columns and rows representing a subset of data that is a portion of a first data set, the displayed columns showing only a portion of the first data set, the first data set including data field information;
in response to a selection of a portion of the displayed columns, generate and cause display of data metrics, of the first data set, for data field information in the selected portion of the columns for all the rows including rows of the selected columns that are not displayed;
generate and cause display of a change action to modify data field information of the first data set; and
in response to a selection of the change action, cause update of the data metrics on the display device, the update of the data metrics reflecting changes that would be made in the first data set caused by the selected change action without modifying the first data set.

2. The system of claim 1, wherein the one or more computer hardware processors are further configured to execute the computer-executable instructions to store a log of the change action.

3. The system of claim 1, wherein the one or more computer hardware processors are further configured to execute the computer-executable instructions to:
access the log;

apply each change action in the log to the first data set; and save a second data set, the second data set including modifications made to the first data set based on the change action in the log.

4. The system of claim 2, wherein the one or more computer hardware processors are further configured to execute the computer-executable instructions to iteratively:

receive user input indicating a selection of one of a plurality of displayed change actions; and store a log of selected change actions.

5. The system of claim 4, wherein the one or more computer hardware processors are further configured to execute the computer-executable instructions to:

access the log;

apply each change action in the log to the first data set; and save a second data set, the second data set including modifications made to the first data set based on the change action in the log.

6. The system of claim 4, wherein the one or more computer hardware processors are further configured to execute the computer-executable instructions to:

access the log;

apply each change action stored in the log to a second data set to create a modified second data set; and save the modified second data set as a third data set, the third data set including all of the modifications made to the second data set by the change actions stored in the log.

7. The system of claim 1, wherein the plurality of rows of the first data set includes more than tens thousand of rows of data.

8. The system of claim 1, wherein the change action includes a suggested correction to information in data fields of the identified column and an indicator of importance of the suggested correction.

9. The system of claim 1, wherein the change action includes modifying the data field information to at least one of: changing the spelling of a word; changing the case of letters; deleting a space; adding a space; deleting a period, comma, semi-colon, or colon; or adding a period, comma, semi-colon, or colon.

10. The system of claim 1, wherein the change action comprises replacing data fields that include first information with second information.

11. The system of claim 1, wherein the change action includes changing a data type of at least one data field in the first data set.

12. The system of claim 1, wherein cause update of the data metrics on the display comprises concatenating at least one alphanumeric character or punctuation to information in a plurality of data fields.

13. A method of preparing tabular representable data for further processing, the method comprising:

generating and causing display on a display device data arranged in tabular format including a plurality of columns and rows representing a subset of data that is a portion of a first data set, the displayed columns showing only a portion of the first data set, the first data set including data field information;

in response to a selection of a portion of the displayed columns, generating and causing display of data metrics, of the first data set, for data field information in the selected portion of the columns for all the rows including rows of the selected columns that are not displayed;

generating and causing display of a change action to modify data field information of the first data set; and in response to a selection of the change action, causing update of the data metrics on the display device, the update of the data metrics reflecting changes that would be made in the first data set caused by the selected change action without modifying the first data set.

14. The method of claim 13, further comprising storing a log of the change action.

15. The method of claim 14, further comprising:

accessing the log;

applying each change action in the log to the first data set; and saving a second data set, the second data set including modifications made to the first data set based on the change action in the log.

16. The method of claim 14, further comprising:

accessing the log;

applying each change action stored in the log to a second data set to create a modified second data set; and saving the modified second data set as a third data set, the third data set including all of the modifications made to the second data set by the change actions stored in the log.

17. The method of claim 13, wherein the plurality of rows of the first data set includes more than tens thousand of rows of data.

18. The method of claim 13, wherein the change action includes a suggested correction to information in data fields of the identified column and an indicator of importance of the suggested correction.

19. The method of claim 13, further comprising generating and causing display of tool buttons that when selected allow filtering operations on selected data.

20. The method of claim 13, wherein the change action includes modifying the data field information to at least one of: changing the spelling of a word; changing the case of letters; deleting a space; adding a space; deleting a period, comma, semi-colon, or colon; or adding a period, comma, semi-colon, or colon.

* * * * *